(12) United States Patent
Weikard et al.

(10) Patent No.: US 6,465,539 B1
(45) Date of Patent: Oct. 15, 2002

(54) ELASTIC COATING SYSTEM COMPRISING UV-CURABLE URETHANE (METH) ACRYLATES CONTAINING ISOCYANATE GROUPS AND ITS USE

(75) Inventors: Jan Weikard, Köln (DE); Wolfgang Fischer, Meerbusch (DE); Claus Kobusch, Meerbusch (DE); Wolfram Küttner, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/658,737

(22) Filed: Sep. 11, 2000

(30) Foreign Application Priority Data

Sep. 15, 1999 (DE) .......................... 199 44 156

(51) Int. Cl.$^7$ ................................. C08F 2/48
(52) U.S. Cl. ................ 522/90; 522/96; 522/97; 522/151; 522/152; 522/173; 522/174; 528/44; 528/65; 524/91; 524/507; 428/423.1; 428/423.4; 428/423.7; 428/423.9; 428/425.8; 428/424.2
(58) Field of Search ............... 522/90, 96, 97, 522/173, 174, 151, 152; 528/44, 65; 524/91, 507; 428/423.1, 423.4, 423.7, 423.9, 424.2, 425.8

(56) References Cited

U.S. PATENT DOCUMENTS

| 3,664,861 A | | 5/1972 | Okamura et al. ........ 117/93.31 |
| 5,234,970 A | * | 8/1993 | Kyle ........................ 522/96 |
| 5,322,861 A | * | 6/1994 | Tsuge et al. ................. 522/90 |
| 5,719,227 A | | 2/1998 | Rosenberry et al. ........ 524/590 |
| 6,335,381 B1 | * | 1/2002 | Hovestadt et al. ............ 522/84 |
| 2001/0031369 A1 | * | 10/2001 | Reusmann .................. 428/483 |

FOREIGN PATENT DOCUMENTS

| CA | 2258813 | | 1/1999 |
| CA | 2258813 | | 7/1999 |
| DE | 198 00 528 A1 | * | 7/1999 |
| JP | 5-209038 | * | 8/1993 |

* cited by examiner

Primary Examiner—James J. Seidleck
Assistant Examiner—Sanza L McClendon
(74) Attorney, Agent, or Firm—Joseph C. Gil; Thomas W. Roy

(57) ABSTRACT

The invention relates to an elastic coating system with which dry surfaces can be formed by UV curing of constituents containing (meth)acryloyl groups and by subsequent crosslinking of constituents containing NCO groups with constituents containing active hydrogen. The invention also relates to their use of this coating, system for coating, inter alia, components of plastic.

11 Claims, No Drawings

US 6,465,539 B1

ELASTIC COATING SYSTEM COMPRISING UV-CURABLE URETHANE (METH) ACRYLATES CONTAINING ISOCYANATE GROUPS AND ITS USE

BACKGROUND OF THE INVENTION

1. Field of the invention

The invention relates to an elastic coating system with which dry surfaces can be formed by UV curing of constituents containing (meth)acryloyl groups and by subsequent crosslinking of constituents containing NCO groups with constituents containing active hydrogen. The invention also relates to their use of this coating system for coating, inter alia, components of plastic.

2. Description of the prior art

DE-A-19 800 528 describes coating systems comprising:
a) a urethane (meth)acrylate which contains (meth) acryloyl groups and free isocyanate groups,
b) optionally a further polyisocyanate,
c) a UV initiator which initiates free radical polymerization,
d) one or more compounds which are reactive with isocyanates.

DE-A-19 800 528 furthermore claims a process which is wherein surfaces which can be handled are formed by UV-initiated free radical polymerization and the final properties are formed by a subsequent NCO reaction.

If the coating system described above is applied to a flexible sheet of plastic, the resulting lacquer films indeed have very good optical properties, hardness and resistance to solvents and chemicals, but the films are not elastic enough for use on flexible plastic: If the sheet of plastic is bent by up to 180° at room temperature, the lacquer tears (flexural elasticity test). Similar coatings are described in DE-A 2 809 715.

Accordingly one object of the invention was to provide a coating system which gives elastic coatings which pass the flexural test even at temperatures of −10° C.

It has been found that the incorporation of particular polyester diols into component a) of a coating system according to DE-A-19 800 528 results in very elastic coatings.

SUMMARY OF THE INVENTION

The invention relates to coating systems containing:
a) a urethane (meth)acrylate which contains (meth) acryloyl groups and free isocyanate groups, (NCO),
b) optionally a further polyisocyanate,
c) a UV initiator which initiates free radical polymerization,
d) one or more compounds which are reactive with isocyanates,
wherein the urethane (meth)acrylate contains as a constituent a diol which contains ester groups and has an average number-average molecular weight of 176 to 2,000 in an amount of 1 to 65 wt.%, based on the amount of other constituents of the urethane (meth)acrylate.

DETAILED DESCRIPTION OF THE INVENTION

The present coating system is preferably prepared in two components, component I preferably comprising constituents a) and b) and component II comprising constituents c) and d).

In order to achieve stability to weathering, it is possible to add to component II:
e) a UV absorber with an absorption range up to max. 390 nm and
f) an HALS stabilizer;
furthermore:
g) conventional lacquer additives, such as flow or deaerating agents,
h) catalysts to accelerate the NCO reaction.

Components I and II can each contain, for dilution, a solvent which is inert in the sense of crosslinking.

Component I and component II are combined such that a ratio between the NCO groups and groups which are reactive with NCO of 2:1 to 0.8:1, preferably 1.2:1 to 0.8:1, is established.

The invention furthermore provides the use of the coating systems for lacquering of substrates such as e.g. plastic, metal, wood, textiles, leather or films and of substrates which have already been coated.

Compounds according to a) are prepared from alcohols containing (meth)acryloyl groups and di- or polyisocyanates. The diol according to the invention containing ester groups can be here both a constituent of the alcohols containing (meth)acryloyl groups, a constituent of the polyisocyanates, and a further constituent. Preparation processes for urethane (meth)acrylates are known and are described e.g. in DE-A-1 644 798, DE-A-2 115 373 or DE-A-2 737 406. For the urethane methacrylates according to the invention containing free isocyanate groups, the molar ratio of NCO groups of the di- or polyisocyanates to hydroxyl (OH) groups of the alcohols containing (meth) acryloyl groups and the OH groups of the diol containing ester groups is from 1:0.2 to 1:0.8, preferably 1:0.3 to 1:0.6. It is also possible to use a mixture of a urethane (meth) acrylate which contains no free NCO groups with a urethane (meth)acrylate containing free isocyanate groups as long as this mixture corresponds to the abovementioned ratio of NCO groups to OH groups of its building units. Alcohols containing (meth)acryloyl groups are to be understood as including both esters, containing a free hydroxyl group, of acrylic acid or methacrylic acid with di-hydric alcohols, such as, 2-hydroxyethyl, 2- or 3-hydroxypropyl or 2-, 3- or 4-hydroxybutyl (meth)acrylate, and mixtures of such compounds. Monohydric alcohols containing (meth)acryloyl groups or reaction products which comprise such alcohols and are obtained by esterification of n-hydric alcohols with (meth)acrylic acid are also possible. The variable n represents an integer or a statistically average fraction of greater than 2 to 4, preferably 3, and from (n-0.6) to (n-2.2), preferably from (n-0.8) to (n-1.2), particularly preferably (n-1) mol (meth)acrylic acid being employed per mol of the alcohols mentioned. These compounds and product mixtures include, for example, the reaction products of i) glycerol, trimethylolpropane or pentaerythritol, or low number-average molecular weight alkoxylation products of such alcohols, such as, ethoxylated or propoxylated trimethylolpropane, such as, the addition product of ethylene oxide on trimethylolpropane of OH number 550, or mixtures of such at least trihyric alcohols with dihydric alcohols, such as, ethylene glycol or propylene glycol, with ii) (meth) acrylic acid in the molar ratio mentioned.

These compounds have a number-average molecular weight of 116 to 1,000, preferably 116 to 750, and particularly preferably 116 to 158.

The reaction products of these monohydric alcohols containing (meth)acryloyl groups with ε-caprolactone can furthermore be employed. These products then contain the diol according to the invention containing ester groups. The reaction products of hydroxyalkyl (meth)acrylates, such as, 2-hydroxyethyl, 2- or 3-hydroxypropyl or 2-, 3- or 4-hydroxybutyl (meth)acrylate, with ε-caprolactone are preferred. Such products are obtainable, for example, as Tone® Monomer 100 from Union Carbide.

These compounds have a number-average molecular weight of 230 to 3,000, preferably 230 to 1,206, and particularly preferably 344 to 572.

Suitable di- or polyisocyanates include (cyclo)aliphatic araliphatic and aromatic compounds. The (cyclo)aliphatic compounds are preferred, including butylene-diisocyanate, hexamethylene-diisocyanate (HDI), isophorone-diisocyanate (IPDI), trimethylhexamethylene-diisocyanate (=2,2,4- and/or 2,4,4-trimethylhexamethylene-diisocyanate), di(isocyanatocyclohexyl)methane, isocyanatomethyl-1,8-octane-diisocyanate or derivatives thereof with a urethane, isocyanurate, allophanate, biuret, uretdione or iminooxadiazinedione structure and mixtures thereof.

Polyisocyanates containing urethane groups which have isocyanurate structural units and are prepared from diisocyanates and diols containing ester groups, the preparation of which is described e.g. in EP-A-336 205, are preferred.

These products then contain the diol according to the invention containing ester groups. 1,6-Diisocyanatohexane and polyester diols of average number-average molecular weight from 176 to 2,000, preferably 350 to 950, particularly preferably 500 to 800 are preferred as starting products. These known polyester diols are built up from diols and dicarboxylic acids. Suitable diols for the preparation of the polyester diols include dimethylolcyclohexane, ethanediol, 1,2- and 1,3-propanediol, 1,2-, 1,3 and 1,4-butanediol and neopentylglycol. Mixtures thereof with 1,6-hexanediol are preferred, and 1,6-hexanediol is particularly preferred as the sole diol component.

Suitable dicarboxylic acids include aromatic dicarboxylic acids, such as phthalic acid, isophthalic acid and terephthalic acid; cycloaliphatic dicarboxylic acids, such as hexahydrophthalic acid, tetrahydrophthalic acid and anhydrides thereof; and aliphatic dicarboxylic acids, which are preferably used, such as succinic acid, glutaric acid, adipic acid, suberic acid, azelaic acid and sebacic acid and anhydrides thereof. It is also possible for any desired mixtures of the starting materials mentioned by way of example to be reacted or for any desired mixtures of the reaction products to be employed. However, polyester diols from ε-caprolactone of the number-average molecular weight range mentioned which have been prepared in a known manner from a diol of the type mentioned above by way of example, as the starter molecule, and ε-caprolactone are particularly preferred. 1,6-Hexanediol is preferably used as the starter molecule here.

ε-Caprolactone diols which are started on 1,6-hexanediol and which have a very narrow oligomer distribution, which can be achieved by using boron trifluoride etherate or organic tin compounds as a catalyst in the polymerization, are especially preferred as a component. These especially preferred ester diols comprise molecules in a number-average molecular weight range of 460 to 802 to the extent of more than 50 wt. %.

The diol according to the invention containing ester groups can also be added as a further constituent in the preparation of the urethane (meth)acrylates according to a).

The polyester diols have an average number-average molecular weight of 176 to 2,000, preferably 350 to 950, particularly preferably 500 to 800. These known polyester diols are built up from diols and dicarboxylic acids. Suitable diols for the preparation of the polyester diols include dimethylolcyclohexane, ethanediol, 1,2- and 1,3-propanediol, 1,2-, 1,3- and 1,4-butanediol and neopentylglycol. Mixtures thereof with 1,6-hexanediol are preferred, and 1,6-hexanediol is particularly preferred as the exclusive diol component. Suitable dicarboxylic acids include aromatic dicarboxylic acids, such as phthalic acid, isophthalic acid and terephthalic acid, cycloaliphatic dicarboxylic acids, such as hexahydrophthalic acid, tetrahydrophthalic acid and anhydrides thereof, and aliphatic dicarboxylic acids, which are preferably used, such as succinic acid, glutaric acid, adipic acid, suberic acid, azelaic acid and sebacic acid and anhydrides thereof, adipic acid being particularly preferred. It is also possible for any desired mixtures of the starting materials mentioned by way of example to be reacted or for any desired mixtures of the reaction products to be employed. However, polyester diols from F-caprolactone of the number-average molecular weight range mentioned which have been prepared in a known manner from a diol of the type mentioned above by way of example, as the starter molecule, and ε-caprolactone are particularly preferred. 1,6-Hexanediol is preferably used as the starter molecule here.

ε-Caprolactone diols which are started on 1,6-hexanediol and which have a very narrow oligomer distribution are especially preferred as a component. This can be achieved e.g. by using boron trifluoride etherate or organic tin compounds as a catalyst in the polymerization. These especially preferred ester diols comprise molecules in a number-average molecular weight range of 460 to 802 to the extent of more than 50 wt. %.

The addition reaction of the isocyanate-containing constituent with the alcohol-containing constituent to give the urethane (meth)acrylate according to a) can be accelerated in a manner known per se by means of suitable catalysts, including tin octoate, dibutyltin dilaurate or tertiary amines.

The resulting urethane (meth)acrylate containing free NCO groups must be stabilized against premature polymerization by addition of suitable inhibitors and antioxidants, including phenols, hydroquinones and optionally also quinones, such as e.g. 2,5-di-tert-butylquinone.

These inhibitors are added in amounts of in each case 0.001 to 0.3 wt. % during or after the preparation.

The products can be prepared in solvents which are inert in the sense of the preparation and later use.

Further polyisocyanates mentioned under point b) are preferably polyisocyanates based on butylene-diisocyanate, hexamethylene-diisocyanate (HDI), isophorone-diisocyanate (IPDI), trimethylhexamethylene-diisocyanate (=2,2,4- and/or 2,4,4-trimethylhexamethylene-diisocyanate), neopentyl diisocyanate, di(isocyanatocyclohexyl)methane or 4-isocyanatomethyl-1,8-octane-diisocyanate, which contain urethane, isocyanurate, allophanate, biuret, uretdione or iminooxadiazinedione structural units or mixtures thereof.

UV initiators corresponding to point c) can be 2-hydroxyphenyl ketones, such as e.g. 1-hydroxycyclohexyl phenyl ketone; benzil ketals, such as e.g. benzil dimethyl ketal; acylphosphine oxides, such as e.g. bis-(2,4,6-trimethylbenzoyl)-phenylphosphine oxide; diacylphosphine oxides, benzophenone and derivatives thereof or mixtures of the various types of UV initiators.

Compounds corresponding to point d) which are reactive with isocyanates include polyols. These can be obtained by esterification of di- or triols with dicarboxylic acids. Hydroxy-functional copolymers, prepared substantially from (meth)acrylic acid esters, hydroxyalkyl-(meth)acrylic acid esters and optionally styrene and/or other monomers, such as e.g. acrylonitrile, are furthermore suitable. Further polyols include polyether polyols such as those obtained by alkoxylation of di- or polyols. Possible further compounds which are reactive with isocyanates include sterically hindered amines such as are formed by addition of maleic acid esters on to aliphatic primary diamines.

It is also possible that the compounds which are reactive with isocyanates additionally contain ethylenically unsaturated groups, e.g. esters of (meth)acrylic acid. Such compounds are prepared, for example, by preparing hydroxy-functional copolymers, such as polyacrylates, using epoxide-carrying monomers. The epoxide groups are reacted with (meth)acrylic acid in a further step.

To achieve stability of the cured lacquer layer to weathering, a UV absorber with an absorption range up to max. 390 nm and an HALS stabilizer are preferably added to component II, corresponding to points e) and f). Suitable UV absorbers are of the triphenyltriazine type, e.g. Tinuvine® 400 (Ciba), or of the oxalic acid dianilide type, e.g. Sanduvor® 3206 (Clariant). The UV absorbers are preferably added in amounts of in each case 0.5 to 3.5%, based on resin solids. Suitable HALS stabilizers are the commercially available types, such as Tinuvin® 292 or Tinuvin® 123 (Ciba) or Sanduvor® 3058 (Clariant). These HALS stabilizers are preferably added in amounts of 0.5 to 2.5%, based on resin solids.

Examples which may be mentioned of lacquer additives according to g) are: deaerating agents, including polyacrylates, and flow agents, including polysiloxanes.

Suitable solvents are inert towards isocyanate groups and C=C double bonds, and include esters, ketones, ethers, ether esters, alkanes or aromatic solvents, such as xylenes or toluene.

If all the constituents of the coating system according to the invention are formulated as one component, the system has a pot life. A preferred formulation form is therefore a two-component system, wherein component I comprises constituents a) and b) and component II comprises constituents c) and d) and optionally all the constituents of e) to h). The particular components are then stable to storage analogously to the storage stability of the constituents. The two components are mixed in the stated ratio before application, or applied via so-called two-component units.

The coating system according to the invention can be applied with all the conventional application methods, preferably via spray, casting or roller application.

Curing is achieved as follows:
Step 1: By evaporation of solvents optionally added. This is carried out at room temperature or elevated temperature, preferably up to 80° C.
Step 2: By UV curing, for which commercially available high- and medium-pressure mercury lamps are suitable; these lamps can be doped by other elements and preferably have an output of 80 to 240 W/cm lamp length.
Step 3: By crosslinking the NCO-containing constituents with the constituents which are reactive with NCO-containing constituents. This can be carried out at room temperature or elevated temperature, advantageously below 150° C.

One variant of the curing process comprises allowing the reaction of the NCO-containing constituents to proceed partly during the UV curing by elevated temperature.

The coating systems according to the invention are suitable for coating and preferably for lacquering any desired substrates, such as textiles, leather, wood, metal, plastics, films etc. Systems which have already been coated and/or lacquered can also be coated and/or lacquered with the systems according to the invention.

EXAMPLES

Urethane Acrylate A 382 g Desmodur® VP LS 2010/1 (trial product of Bayer AG, Leverkusen, polyisocyanate substantially comprising HDI isocyanurates and elasticized with a polyester, NCO content: 11 wt. %, viscosity 4,800 to 7,200 mPa.s at 23° C.) were dissolved in 126.6 g n-butyl acetate. 0.25 g dibutyltin dilaurate and 1.0 g 2,6-di-tert-butyl-4-methyl-phenol were added to the solution. The solution was heated to 60° C. while passing air through and stirring. The heating source was removed and 117 g 2-hydroxypropyl acrylate were first added dropwise such that the temperature is between 55 and 65° C. Thereafter, the reaction was continued at 60° C. until the NCO content was below 0.65%. 7.3 g 2-ethyl-1,3-hexanediol were then added dropwise. The reaction was subsequently carried out at 60° C. until the NCO content of the solution was less than 0.10 wt. %.

Urethane Acrylate B 920.0 g Desmodur® N 3600 (commercial product of Bayer AG, Leverkusen, polyisocyanate substantially comprising HDI isocyanurates, NCO content: 23.4 wt. %, viscosity 1,200 mPa.s at 23° C.) were dissolved in 394.5 g n-butyl acetate. 0.8 g di-butyltin dilaurate and 1.6 g 2,6-di-tert-butyl-4-methyl-phenol were added to the solution. The solution was heated to 60° C. while passing air through and stirring. The heating source was removed and 435.0 g 2-hydroxyethyl acrylate were first added dropwise such that the temperature is between 55 and 65° C. Thereafter, the reaction was continued at 60° C. until the NCO content was below 3.0%. 223.2 g of a polyester polyol from hexanediol and adipic acid (OH number 314, equivalent weight 178.5 g) were then added dropwise. The reaction was subsequently carried out at 60° C. until the NCO content of the solution was less than 0.10 wt. %.

Urethane Acrylate C 220.8 g Desmodur® N 3600 (commercial product of Bayer AG, Leverkusen, polyisocyanate substantially comprising HDI isocyanurates, NCO content: 23.4 wt. %, viscosity 1,200 mPa.s at 23° C.) were dissolved in 202.6 g n-butyl acetate. 0.4 g dibutyltin dilaurate and 0.8 g 2,6-di-tert-butyl-4-methyl-phenol were added to the solution. The solution was heated to 60° C. while passing air through and stirring. The heating source was removed and 574.8 g of the reaction product of 2-hydroxyethyl acrylate with ε-caprolactone (in a molar ratio of 1:4) were first added dropwise such that the temperature was between 55 and 65° C. Thereafter, the reaction was continued at 60° C. until the NCO content was below 1.0%. 14.6 g 2-ethyl-1,3-hexanediol were then added dropwise. The reaction was subsequently carried out at 60° C. until the NCO content of the solution was less than 0.10 wt. %.

Urethane acrylate D 397.4 g Desmodur® N 3600 (commercial product of Bayer AG, Leverkusen, polyisocyanate substantially comprising HDI isocyanurates, NCO content: 23.4 wt. %, viscosity 1,200 mPa.s at 23° C.) were dissolved in 201.8 g n-butyl acetate. 0.4 g dibutyltin dilaurate and 0.8 g 2,6-di-tert-butyl-4-methyl-phenol were added to the solution. The solution was heated to 60° C. while passing air through and stirring. The heating source was removed and 383.4 g of the reaction product of 2-hydroxyethyl acrylate with ε-caprolactone (in a molar ratio of 1:0.85) were first added dropwise such that the temperature was between 55 and 65° C. Thereafter, the reaction was continued at 60° C. until the NCO content was below 2.0%. 26.3 g 2-ethyl-1,3-hexanediol were then added dropwise. The reaction was subsequently carried out at 60° C. until the NCO content of the solution was less than 0.10 wt. %.

Urethane Acrylate E 661.9 g of the ethylene oxide polyether started from trimethylolpropane esterified with 2 mol acrylic acid (12 mol ethylene oxide per mol trimethylolpropane) and 164.4 g of a polyester polyol from hexanediol and adipic acid (OH number 314, equivalent weight 178.5 g), 1.0 g 2,6-di-tert-butyl-4-methyl-phenol and 1.0 g tin octoate were initially introduced into the reaction vessel. 148.8 g Desmodur® T80 (toluylene diisocyanate, commercial product of Bayer AG, Leverkusen) were metered in at 50 to 60° C. After a further 5 h 31.6 g isophorone-diisocyanate were metered in. The reaction was carried out at 60° C. for a further 5 h and 74.0 g of the ethylene oxide polyether started from trimethylolpropane esterified with 2 mol acrylic acid (12 mol ethylene oxide per mol trimethylolpropane) were then added. The reaction was subsequently carried out at 60° C. until the NCO content of the solution was less than 0.10 wt. %.

Urethane Acrylate F Containing NCO Groups 552.0 g Desmodur® N 3600 (commercial product of Bayer AG, Leverkusen, polyisocyanate substantially comprising HDI isocyanurates, NCO content: 23.4 wt. %, viscosity 1,200 mPa.s at 23° C.) were dissolved in 167 g n-butyl acetate. 1.6 g 2,6-di-tert butyl-4-methyl-phenol were added to the solution. The solution was heated to 60° C. while passing air through and stirring. The heating source was removed and 116.0 g 2-hydroxyethyl acrylate were added dropwise such that the temperature was between 55 and 65° C. Thereafter, the reaction was continued at 60° C. until the NCO content is below 10.4%.

Urethane Acrylate G Containing NCO Groups 460.8 g Desmodur® VP LS 2010/1 (trial product of Bayer AG, Leverkusen, polyisocyanate substantially comprising HDI isocyanurates and elasticized with a polyester, NCO content: 11 wt. %, viscosity 4,800 to 7,200 mPa.s at 23° C.) were dissolved in 125 g n-butyl acetate. 0.5 g 2,6-di-tert-butyl-4-methyl-phenol were added to the solution. The solution was heated to 60° C. while passing air through and stirring. The heating source was removed and 39.2 g 2-hydroxyethyl acrylate are added dropwise such that the temperature was between 55 and 65° C. Thereafter, the reaction was continued at 60° C. until the NCO content was below 6.4%.

Formulation of the Lacquers

The following coating systems according to the invention were formulated: binder content 55%, flow time DIN-4 cup (4 mm nozzle DIN 53 211) approx. 20 s.

| Example no. | Urethane acrylate letter/parts by wt. | Urethane acrylate containing NCO groups letter/parts by wt. | Polyol: Desmophen ® A 575 75% butyl acetate parts by wt. | Photoinitiator Irgacur ® 184 50% butyl acetate parts by wt. | Additives and solvents |
|---|---|---|---|---|---|
| 1 | A/38.2 | F/12.7 | 19.0 | 1.5 | 28.8[1] |
| 2 | B/38.2 | F/12.7 | 19.0 | 1.5 | 28.8[1] |
| 3 | C/38.2 | F/12.7 | 19.0 | 1.5 | 28.8[1] |
| 4 | D/38.2 | F/12.7 | 19.0 | 1.5 | 28.8[1] |
| 5 | A/43.5 | G/14.4 | 11.9 | 1.3 | 29.3[2] |
| 6 | E/38.2 | F/12.7 | 19.0 | 1.5 | 28.8[1] |

[1] of these [parts by wt.]: 2-methoxypropyl acetate 18.9, Solvesso ® 100 6.4, Baysilone ® Lacquer Additive OL 17 (Bayer AG), 10% in butyl acetate 0.2, Modaflow ® (Monsanto), 10% in butyl acetate 0.2, Sanduvor ® 3206 (Clariant) 1.7, Sanduvor ® 3085 (Clariant) 0.7, Byk ® 306 (Byk-Chemie) 0.7.
[2] of these [parts by wt.]: 2-methoxypropyl acetate 19.4, Solvesso ® 100 6.4, Baysilone ® Lacquer Additive OL 17 (Bayer AG), 10% in butyl acetate 0.2, Modaflow ® (Monsanto), 10% in butyl acetate 0.2, Sanduvor ® 3206 (Clariant) 1.7, Sanduvor ® 3085 (Clariant) 0.7, Byk ® 306 (Byk-Chemie) 0.7.

Example 2 from DE-A-19 800 528 was reworked as a comparison.

Immediately after preparation, the lacquers formulated were applied by means of compressed air spray application (nozzle 1.4 mm diameter, spraying pressure 2.3 bar) to untreated polyurethane integral foam sheets (Bayflex® MP 10 000, 5 mm, Bayer AG) (resulting layer thickness approx. 40–50 μm) The sheets were then predried at 60° C. for 10 min and were subsequently moved twice under a high-pressure mercury lamp (80 W/cm) at a belt speed of 2 m/min. All the resulting coatings were dry and easy to handle. An after-treatment of 16 h at 60° C. also followed as the last step.

The lacquers were then tested. In all cases a resistance to chemicals (solvents, dil. acid and alkali) which corresponds to the level of an elastic 2-component polyurethane lacquering of the prior art resulted. The procedure for testing the elasticity was as follows: The sheets were bent through 180° around a mandrel of 2.6 cm diameter. It was investigated whether the lacquering remains intact. If the result was positive, the sheet and mandrel were cooled in 10° C. steps, kept at the corresponding temperature for 1 h in each case, and the bending test was repeated. This procedure was continued until the lacquering tore.

| Example | 1 | 2 | 3 | 4 | 5 | 6 |
|---|---|---|---|---|---|---|
| Lowest temp. at which the | −10° C. | 10° C. | −20° C. | 10° C. | −20° C. | 0° C. |

-continued

| Example | 1 | 2 | 3 | 4 | 5 | 6 |
|---|---|---|---|---|---|---|
| lacquer is still undamaged | | | | | | |
| Temperature at which the lacquer tears | −20° C. | 0° C. | −30° C. | 0° C. | −30° C. | −10° C. |

Comparison example 2 from DE-A-19 800 528 already tore during the first testing at 20° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating systems comprising:
   a) a urethane (meth)acrylate which contains (meth)acryloyl groups and free isocyanate groups,
   b) optionally a further polyisocyanate,
   c) a UV initiator which initiates free radical polymerization,
   d) one or more compounds which are reactive with isocyanates,
   wherein the urethane (meth)acrylate contains as a constituent a diol which contains ester groups and has an average number-average molecular weight of 176 to 2,000 in an amount of 1 to 65 wt. %, based on the amount of other constituents of the urethane (meth)acrylate.

2. The coating systems of claim 1, wherein the compound which is reactive with isocyanate is a polyol.

3. The coating system of claim 1, wherein the compound which is reactive with isocyanate contains ethylenically unsaturated groups.

4. The coating system of claim 1, wherein the compound which is reactive with isocyanate contains a sterically hindered, secondary, polyfunctional amine.

5. The coating system of claim 1, comprising further polyisocyanates.

6. The coating systems of claim 1, comprising a UV absorber with an absorption range up to 390 nm.

7. The coating system of claim 1, comprising a HALS amine.

8. A coated substrate coated with a coating system comprising:
   a) a urethane (meth)acrylate which contains (meth)acryloyl groups and free isocyanate groups,
   b) optionally a further polyisocyanate,
   c) a UV initiator which initiates free radical polymerization,
   d) one or more compounds which are reactive with isocyanates, wherein the urethane (meth)acrylate contains as a constituent a diol which contains ester groups and has an average number-average molecular weight of 176 to 2,000 in an amount of 1 to 65 wt. %, based on the amount of other constituents of the urethane (meth)acrylate.

9. The coated substrate of claim 8, wherein the substrate material contains metal, wood, textiles or leather.

10. The coated substrate of claim 8, wherein the substrate material contains plastic.

11. The coated substrate of claim 8, wherein the substrate material is a film.

* * * * *